UNITED STATES PATENT OFFICE.

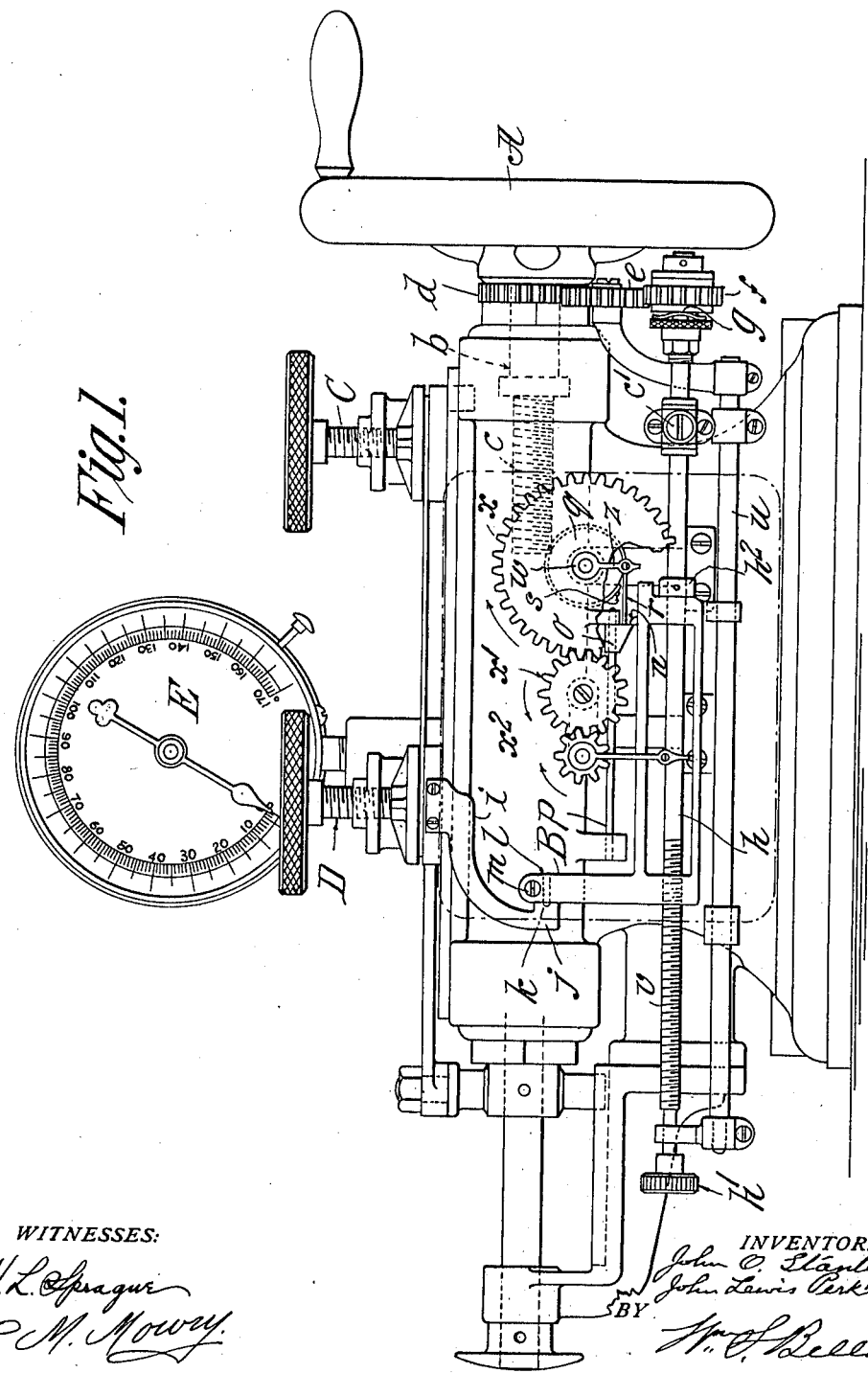

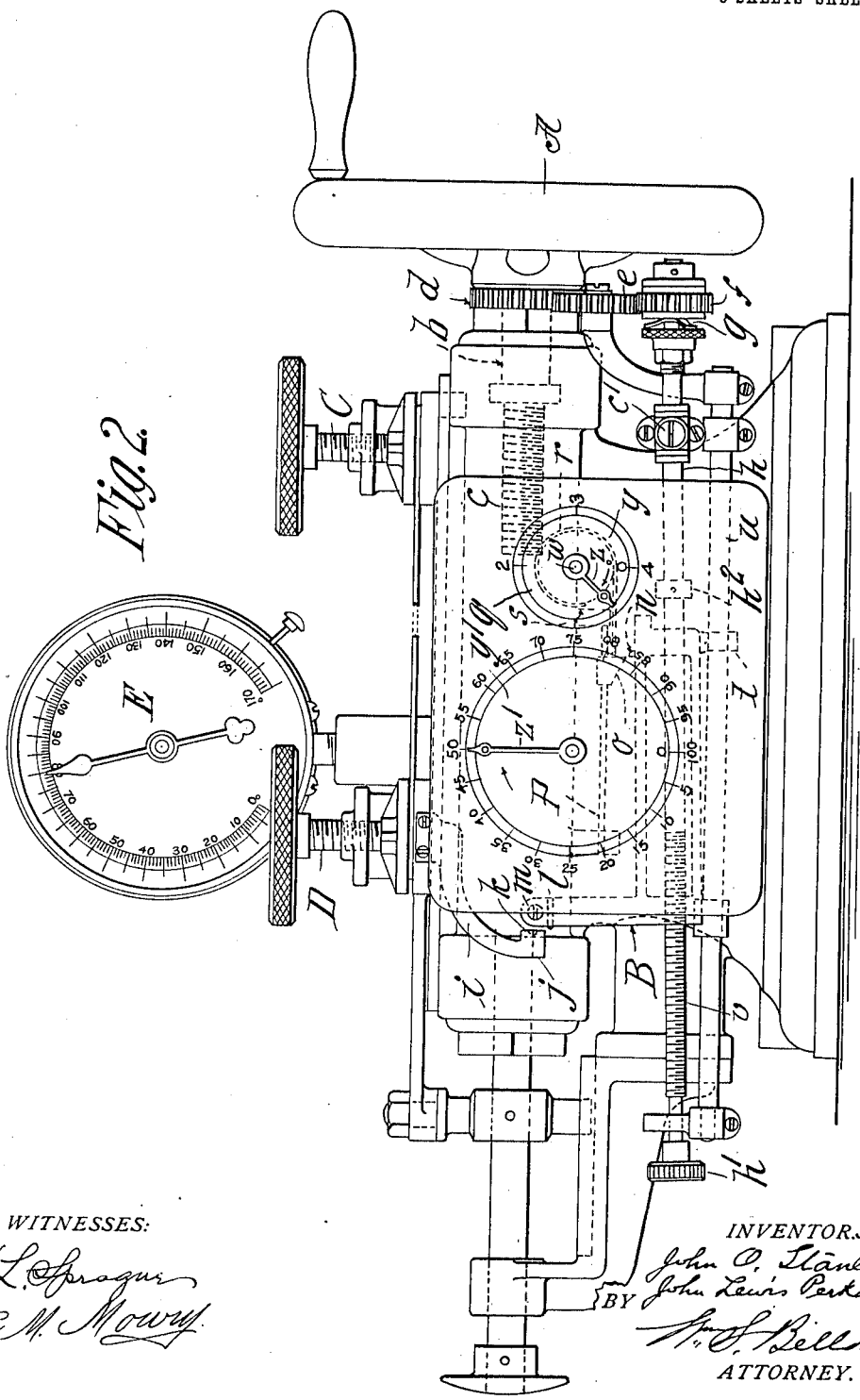

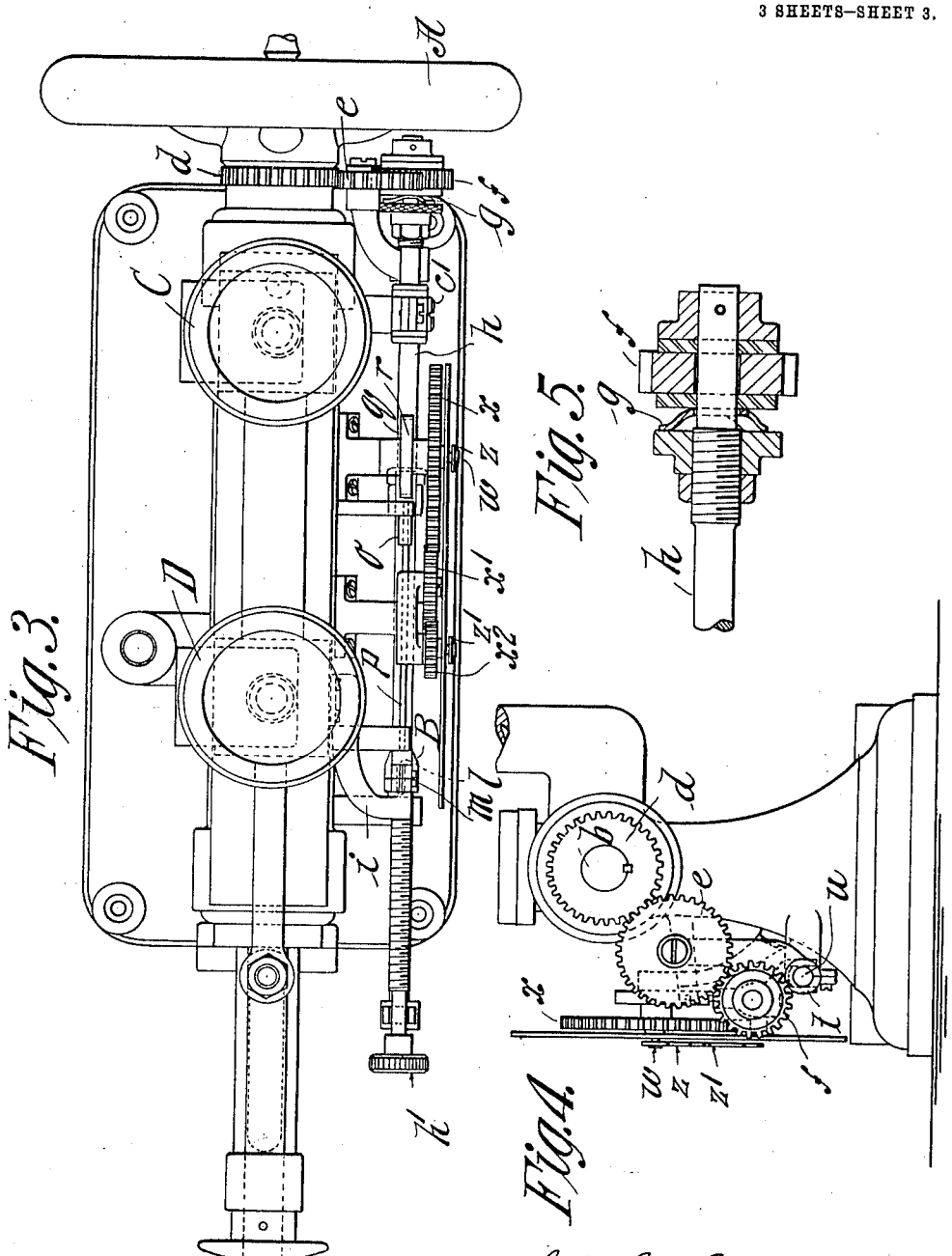

JOHN O. STANLEY AND JOHN LEWIS PERKINS, OF HOLYOKE, MASSACHUSETTS, ASSIGNORS TO B. F. PERKINS & SON, INCORPORATED, OF HOLYOKE, MASSACHUSETTS, A CORPORATION OF MASSACHUSETTS.

STRENGTH-TESTING APPARATUS.

1,021,012.   Specification of Letters Patent.   Patented Mar. 26, 1912.

Application filed July 20, 1910. Serial No. 572,907.

*To all whom it may concern:*

Be it known that we, JOHN O. STANLEY and JOHN LEWIS PERKINS, citizens of the United States of America, and residents of Holyoke, in the county of Hampden and State of Massachusetts, have invented certain new and useful Improvements in Strength-Testing Apparatuses, of which the following is a full, clear, and exact description.

The present stretch testing apparatus is an improvement over the one disclosed in Letters Patent of the United States, No. 924,579, granted June 8, 1909, and comprises improved mechanism and devices mounted on said machine for accurately ascertaining the limit of stretching and mechanically registering the same up to the point of breakage.

The apparatus comprises a base or support having a cylindrical liquid containing bore therein, a piston in the bore and means for endwise moving it against the liquid, another piston in the bore, in resistance against the liquid subjected to pressure by the first piston and also endwise movable when a breaking pressure or strain is attained, said second piston having a stem longitudinally extended to the exterior of the bore provided base, a pair of clamps for confining end portions of the sheet material, one of which is fixed and the other longitudinally movable, and also oscillatory by reason of having a link-connection with the aforesaid extended piston stem, and a pressure gage connected with the said bore for indicating the maximum pressure to which the liquid is subjected as a medium of transmission of the force exerted between the two pistons, together with a train of gears, a suitably mounted frame, a frictionally driven shaft, properly proportionate gears and a graduated dial with accompanying index pointers to register, accurately, the amount of stretch in the said sheet material at the point of breakage, all as hereinafter described.

In the drawings:—Figure 1 is a side elevation showing the machine with the driving mechanism for the dial and the sheet material in position for testing. Fig. 2 is a side elevation similar to Fig. 1 with the dial showing the sheet material broken, the pressure gage recording the number of pounds pressure required to obtain the desired result and also showing the index finger indicating the amount of stretch at the point of failure. Fig. 3 is a plan view of the mechanism showing the relation of the parts of the mechanism. Fig. 4 is an end view of the machine with the hand wheel removed, showing the relation of the gearing which operates the stretch registering portion of the machine. Fig. 5 is a sectional detail view of the adjustable friction clutch and gear employed in the above referred to improvements.

Similar characters of reference indicate corresponding parts in all of the views.

In the drawings,—A represents a hand wheel mounted on the shaft $b$ having the screw threaded portion $c$ which is revolved by the hand wheel which operates the entire machine. At a convenient point on the shaft $b$ is mounted a gear $d$ which drives through the intermediate gear $e$ onto the gear $f$ which through the medium of friction drive by the pressure of the spring $g$ causes the shaft $h$ to revolve. The shaft $h$ is mounted in a frame B which is trunnioned at a point on the stud $c'$, said shaft having a limited motion up and down, which limits may be seen by a comparison of the positions of the same in Figs. 1 and 2. As will be clearly seen, the clamp C is stationary and the clamp D is movable. Rigidly secured to the clamp D is a bracket $i$ which has at its lower extremity a boss $j$ having drilled therein a shallow hole $k$ which engages a pin $l$ clamped by the screw $m$ to the bracket B.

Referring to Fig. 1, it will be noted that the frame B is placed in such a position relative to the bracket $i$ that the pin $l$ engages the hole $k$, thereby holding the bracket in its upper position on the trunnion $c'$. It must also be understood that the paper or sheet material to be tested is secured in the clamps C and D, and that both pressure dial E and index pointers $z'$ and $z$ are each placed at zero. The frame B has thereon a tooth shaped stud $n$ which is brought into relation as shown in Fig. 1 to a movable block $o$ which slides on the small stationary shaft $p$, said block $o$ having secured to it and in encircling relation a pulley $q$ and a thin belt $r$ of a non-yielding material, the end of which is secured to the pulley $q$ by the pin $s$. The said frame B is held against rotative displacement by the bifurcated extremity $t$ engaging the stationary shaft $u$; and it will be noted that the shaft $h$ has a threaded portion $v$ which has a threaded engagement with the frame B, and that by revolving the large hand wheel A the clamp D is caused to move owing to the increased pressure on the liquid, and that through the train of gears $d$ the intermediate gear $e$ and gear $f$ and shaft $h$ by the threaded portion $v$ causes the frame B to move in the same direction as the clamp D. The threaded portion $c$ of the shaft $b$, and the threaded portion $v$ of the shaft $h$ are arranged at variance to each other so that the shaft $h$ will revolve faster than the shaft $b$; but for the employment of a frictional drive (see Fig. 5) on the shaft $h$ which comprises the loosely mounted gear $f$ driven by the spring $g$, this combination of mechanisms causes the frame B to be held against the bracket $i$ and the interlocking of the pin $l$ and hole $k$ to be maintained to a point where the pressure brought to bear on the paper or sheet material causes the same to break, as shown in Fig. 2. At the moment of the failure of the paper owing to the extreme pressure brought to bear upon the movable clamp D, the same continues to move on its guides for an indefinite distance, thereby instantly releasing the pin $l$ from the hole $k$, at which time the frame B falls, by gravity, to the position shown in Fig. 2, at which time the tooth shaped stud $n$ also is disengaged from the sliding block $o$, and a reading may be made of the pressure gage, as shown in the drawing, Fig. 2, namely 80 pounds, and the index finger fifty one-hundredths of an inch. This shows that eighty pounds pressure has been required to break the paper, and that one-half inch of stretch was obtained before the failure of the material.

By referring to Figs. 1 and 2, it will be seen that the shaft $w$ has been revolved one-eighth of a revolution, and the gear $x$ which is secured thereto and the intermediate gear $x'$ has caused the small gear $x^2$ to revolve one-half of a revolution, the ratio of said gears being 4 to 1, from which it will be understood that the dial $y$ indicates inches, the dial $y'$ hundredths of an inch, and that one complete revolution of the index pointer $z$ on the dial $y$,—indicating 4 inches,— would cause 4 revolutions of the index $z'$ on the dial $y'$, thereby giving a very minute reading of the limit of stretch. The clamp D may be returned to its original position, and the bracket B, by revolving the shaft $h$ through the medium of the knurled wheel $h'$ may be returned to its proper position, namely, to such a point that the bracket B engages the fixed collar $h^2$, and the machine is in readiness for another operation.

This device is subject to changes in mechanical detail of construction, and the same may be made without departing from the spirit of the invention or sacrificing any of the advantages thereof.

Having thus fully described our invention, what we claim as new, and desire to secure by Letters Patent, is:—

1. In testing apparatus of the character set forth, the combination with a stationary article clamp, of a movable article clamp, means for moving the latter clamp to cause the articles to be broken, including a driving device, a shaft, operative connections between the driving device and the shaft, a reciprocatory frame having connection with the shaft and operable therewith, and indicator means connected to the frame and operable to indicate the amount the article is stretched.

2. In testing apparatus of the character set forth, the combination with a stationary article-clamp, of a movable article-clamp, means for operating the same, including a driving device, a screw shaft geared to the driving device, a frame having a threaded engagement with the shaft, and indicator means connected to the movable frame.

3. In testing apparatus of the character set forth, the combination with relatively movable article-holding clamps, of means for relatively moving the same to cause the article held thereby to be broken, an indicator, operating means for the indicator connected to the clamp-moving means and including a friction clutch, and means movable with one of the clamps for retarding the speed of the operating means.

4. In testing apparatus of the character set forth, the combination with a stationary article clamp, of a movable article clamp, means for moving the latter clamp, including a rotary driving device, a shaft, gearing connected to the driving device and having a friction clutch connection with the shaft, a reciprocatory frame having a threaded engagement with the shaft, rotary indicating devices geared together, and a belt connected to one of the devices and to the frame.

5. In testing apparatus of the character set forth, the combination with relatively movable clamps, of means for relatively moving the same, an abutment carried by one of the clamps, an indicator, operating means for the indicator actuated by the clamp moving means, and means to detachably hold said operating means against the abutment.

6. In testing apparatus of the character set forth, the combination with a stationary clamp, of a movable clamp, means for operating the latter, including a rotary driving device, a threaded shaft having a pivot mounting, a gear connection between the driving device and shaft, including a friction clutch, a reciprocatory frame having a threaded engagement with the shaft and capable of pivotal movement therewith, a pair of rotary indicators geared together, an operating connection between the frame and the indicator, and an abutment carried by the movable clamp and having a detachable interlocking engagement with the frame.

Signed by us at Holyoke, Mass, in presence of two subscribing witnesses.

JOHN O. STANLEY.
JOHN LEWIS PERKINS.

Witnesses:
E. M. CHAPMAN,
J. McKAY.